(12) United States Patent
Breukink (10) Patent No.: US 7,102,543 B2
(45) Date of Patent: Sep. 5, 2006

(54) PORTABLE UNIT FOR THE INPUT OF DATA IN A DIGITAL DEVICE

(76) Inventor: Gerhardus Johannes Breukink, Eikenstraat 34., B-2550 Kontich (BE)

( * ) Notice: Subject to any disclaimer, the term of this patent is extended or adjusted under 35 U.S.C. 154(b) by 386 days.

(21) Appl. No.: 10/472,757

(22) PCT Filed: Mar. 28, 2002

(86) PCT No.: PCT/BE02/00046

§ 371 (c)(1),
(2), (4) Date: Oct. 3, 2003

(87) PCT Pub. No.: WO02/082250

PCT Pub. Date: Oct. 17, 2002

(65) Prior Publication Data

US 2004/0095262 A1 May 20, 2004

(30) Foreign Application Priority Data

Apr. 5, 2001 (BE) .................................. 2001/0236

(51) Int. Cl.
*H03K 17/965* (2006.01)
(52) U.S. Cl. .......................... 341/34; 341/20; 341/22; 345/168; 345/169

(58) Field of Classification Search .................. 341/20, 341/22, 23, 26, 34; 345/173, 168, 169; 455/566; 379/201.01; 400/472, 100, 485
See application file for complete search history.

(56) References Cited

U.S. PATENT DOCUMENTS 6,131,047 A * 10/2000 Hayes et al. ................. 455/566

* cited by examiner

*Primary Examiner*—Michael Horabik
*Assistant Examiner*—Hung Q. Dang
(74) *Attorney, Agent, or Firm*—Bacon & Thomas, LLP (57) ABSTRACT

A portable unit for the input of data in a digital device, includes a control panel (1) on which is located a table (2) with a group of symbols (16) in a number of fields (13), and a base plate (3) with pressure contacts (4, 5). Two selection elements (8, 9) can be moved parallel to the rows (14) and the columns (15) of the table (2) until they are situated opposite to or above a pressure contact (4, 5) in the extension of a selected row (14) or column (15); a pressure mechanism (7) changes the position of the pressure contacts (4, 5) by means of the selection elements (8, 9) situated opposite to or under the latter; and a number of additional pressure contacts (6) which can be manually operated, whose number is equal to the maximum number of symbols (16) of a field (13) is provided.

12 Claims, 6 Drawing Sheets

PORTABLE UNIT FOR THE INPUT OF DATA IN A DIGITAL DEVICE

I. BACKGROUND

A. Field of the Invention

The present invention concerns a portable unit for the input of data, i.e. alphanumerical data and/or function commands, in a digital device with which it can be connected.

In particular, this invention concerns a unit for the input of data and commands in portable digital devices having small dimensions, such as for example handheld computers and PDA's, as well as digital devices for mobile communication such as WAP or GSM and mobile GPS systems.

It is known that these devices in most cases make use of a keyboard for the input of data. Due to the restricted dimensions and also due to the further miniaturization of such devices, the keys and their mutual distances are becoming smaller and smaller, as a result of which it is becoming more and more difficult to press a single selected key with the fingers without simultaneously activating neighboring keys.

Moreover, among others due to the restricted dimensions of the devices, the number of keys is restricted, so that in most cases, a single key has to be used for several alphanumerical symbols and/or function commands.

The required symbol is selected from the number of selected symbols by pressing the key concerned one or several times at short intervals.

By pausing in between two key strokes, the last selected symbol is confirmed and inputted in the connected digital device, and thus said device is instructed that a following symbol or command will be given.

Not only is this method rather time-consuming and not very suitable for fast data input, also an important number of keys is still required to cover all alphanumerical symbols and possibly extra function keys in a user-friendly and practical way.

The present invention aims to provide a solution therefor.

To this end, the invention comprises a portable unit for the input of alphanumerical data and/or function commands in a digital device, which unit comprises a control panel and attached thereto a base plate with pressure contacts which are connected to an electronic processing unit, whereby a table is provided on the control panel with a number of rows and columns consisting of fields and with a group of symbols in a number of fields symbolizing the alphanumerical data or the function commands, and the pressure contacts on the base plate are positioned in two rows which extend parallel to the rows and columns of the table, and whereby each of these pressure contacts is situated in the extension of a row or of a column, whereby this unit further comprises two selection elements which can be moved in relation to the pressure contacts and the table, parallel to the rows and the columns respectively, into positions in which they are situated opposite to a pressure contact in the extension of a selected row, a selected column respectively, and comprises a pressure mechanism which can be manually operated to change the position of the pressure contacts situated opposite to the selection elements by means of the latter, and a number of additional pressure contacts which can be manually operated, whose number is equal to the maximum number of symbols of a field, and which each correspond to one particular symbol of a selected field.

The input of alphanumerical data and/or function commands can be carried out very fast and in a simple manner. It is sufficient to place the two selection elements opposite to the required field and to manually operate the pressure mechanism and one of the additional pressure contacts.

The additional pressure contacts which can be manually operated are preferably provided on the base plate.

Each pressure contact to be manually operated preferably also contains a push button, apart from a switch mechanism, and this push button is part of the pressure mechanism.

Thus, by pressing a single push button, it is possible to operate the pressure mechanism as well as the switch mechanism of a pressure contact to be manually operated in order to select a symbol.

In order to better explain the characteristics of the invention, the following preferred embodiments of a portable unit according to the invention are described as an example only without being limitative in any way, with reference to the accompanying drawings, in which:

IV. DETAILED DESCRIPTION

The portable unit for the input of data in a digital device, represented in FIGS. 1 to 4, mainly consists of a control panel 1 upon which is provided a table 2, a base plate 3 with two rows of pressure contacts 4 and 5 comprising a first group of pressure contacts upon it and a number of contacts 6 comprising a second group which can be manually operated and which are part of a pressure mechanism 7, and two selection elements 8 and 9 which can be moved over the control panel 1 and the base plate 3.

The base plate 3 is provided on the bottom 10 of a flat box 11 whose lid forms the control panel 1.

The table 2 is provided on a rectangular, transparent window 12 which is provided in the middle of the control panel 1 and which contains a number of fields 13 arranged in rows 14 and columns 15.

In a number of fields 13 are provided one to three different symbols 0.16, in an L-shaped pattern, representing a letter, a figure or a function command.

Figure 2:
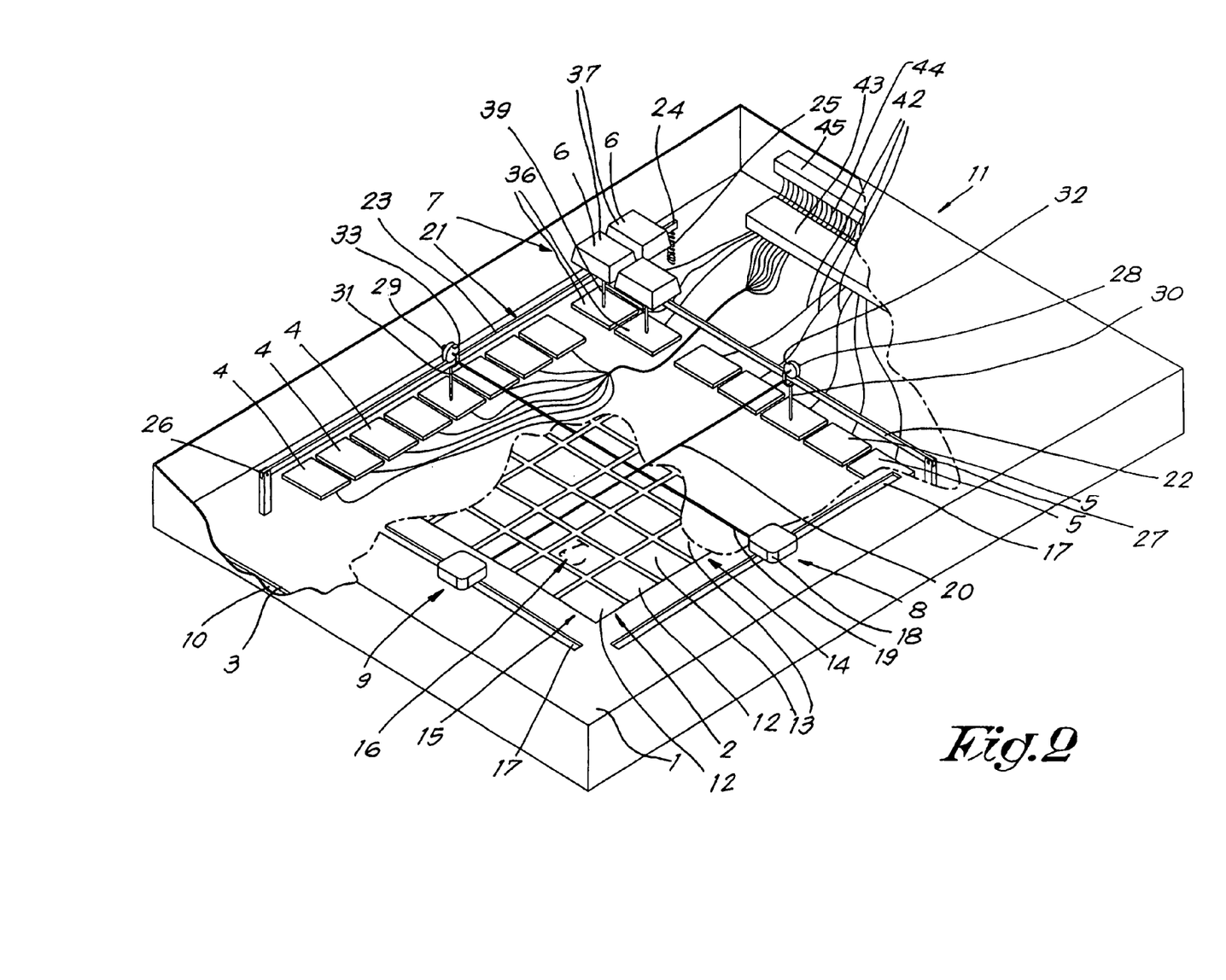
FIG. 2 is a representation in perspective of the unit from FIG. 1, partially cut out.
Figure 3:
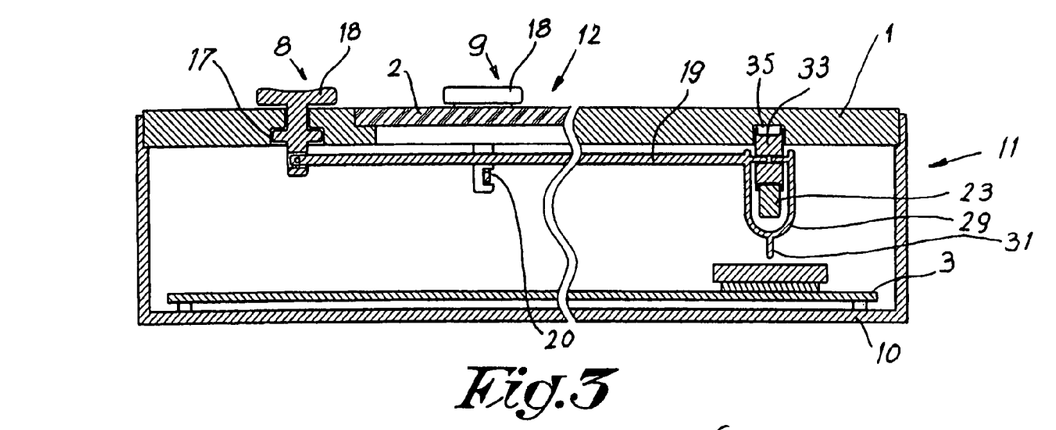
FIG. 3 represents a section according to line III—III in FIG. 1.
Figure 4:
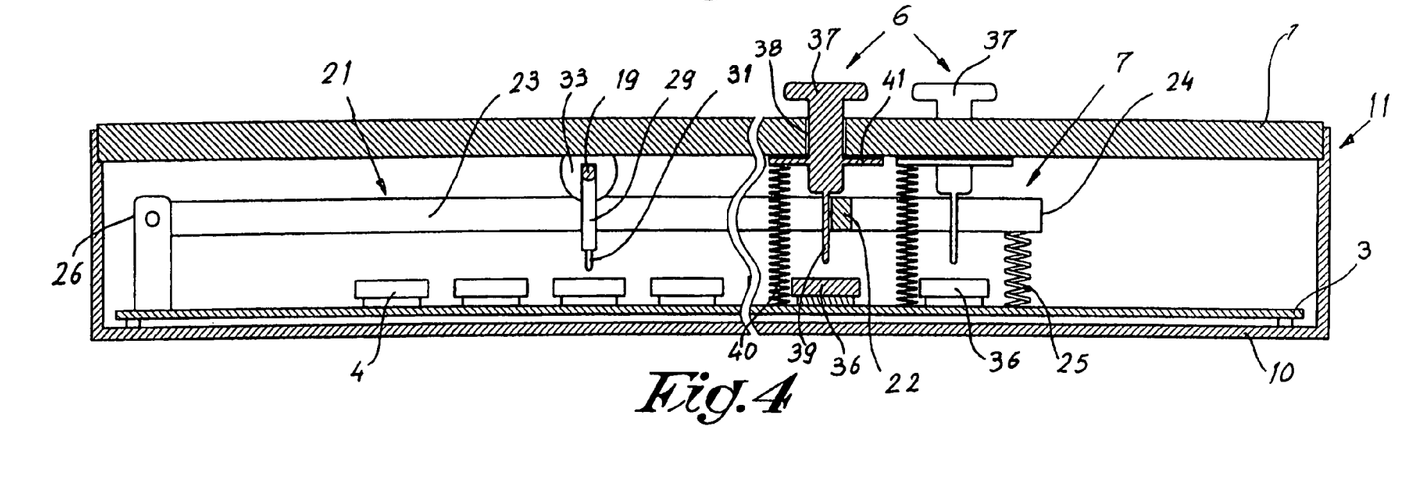
FIG. 4 also represents a section according to line IV—IV in FIG. 1.

For clarity's sake, the symbols 16 are only represented for one of the fields 13 in FIG. 2.

In the control panel 1 are provided two slots 17, next to the window 12 and parallel to the edges thereof, which are parallel to the rows 14 and the columns 15 of the table 2 respectively, and which form guides for two slide buttons 18 which are part of the selection elements 8 and 9.

The selection element 8 and 9 each include a rigid guide wire 19, 20 respectively which is fixed to one of the slide buttons 18, and which extends perpendicularly to the slots 17 under the control panel 1, and which is visible through the window 12 over the entire width and height respectively, of the table 2.

The pressure contacts 4 and 5 are situated practically against one another.

The pressure contacts 4, one of which is situated in the extension of each row 14, form row pressure contacts situated on a row which is parallel to the columns 15.

In a similar way, the pressure contacts 5, one of which is situated in the extension of each column 15, form column pressure contacts situated in a row which is parallel to the rows 14.

The row as well as the column pressure contacts 4 and 5 are situated outside the frame of the window 12 and along the opposite side of the slide buttons 18.

As three symbols may occur in the fields 13, three pressure contacts 6 are provided in the given example. These pressure contacts 6 are erected according to an L-shaped pattern, so that they are situated in pairs in the extension of the rows of row and column pressure contacts 4 and 5.

Apart from the three pressure contacts 6, the pressure mechanism 7 comprises a linkage arrangement 21 working in conjunction with the latter, composed of two bars 22 and 23 which are perpendicular to one another and fixed to one another, situated between the pressure contacts 4 and 5 and the control panel 1, and which together cross all the pressure contacts 4, 5 and 6.

The far end 24 of the bar 23 is spring-mounted on the side of the pressure contacts 6 by means of a spring 25 fixed on the base plate 3. The other far end 26 of the bar 23 and the free end 27 of the bar 22 are hinge-mounted to the base plate 3.

Around every bar 22 and 23 is provided a sliding eye 28, 29 respectively, upon which is provided a locking pin 30 or 31 which is directed towards the pressure contacts 4 and 5.

Said sliding eye 28 or 29 is U-shaped and is suspended to the middle of a little wheel 32 or 33 which rolls over the linkage arrangement 21 and is partly situated in a guiding slot 34 and 35 in the bottom side of the control panel 1.

Moreover, each sliding eye 28 or 29 is fixed to a far end of the guide wire 19 or 20 of the slide button 18 whose sliding direction is parallel to that of the sliding eye 28 or 29 concerned, and thus is part of the selection element 8 or 9.

The three pressure contacts 6 of the second group each contain, apart from a switch mechanism 36, a push button 37 protruding through a guide opening 38 in the control panel 1, and having a narrowed end 39 forming a locking pin pointing towards the switch mechanism 36 and standing at right angles to the base plate 3.

The push button 37 is pressed into its position of rest by means of a spring 40. In this position, its collar 41 will touch the control panel 1 and it will not exert any pressure on the linkage arrangement 21.

The pressure contacts 4, 5 and 6 are electrically connected to an electronic processing unit 43 by means of conductors 42, which is to be connected in turn to a digital device 46 via a conductor 44 and a connection element 45.

Figure 5:
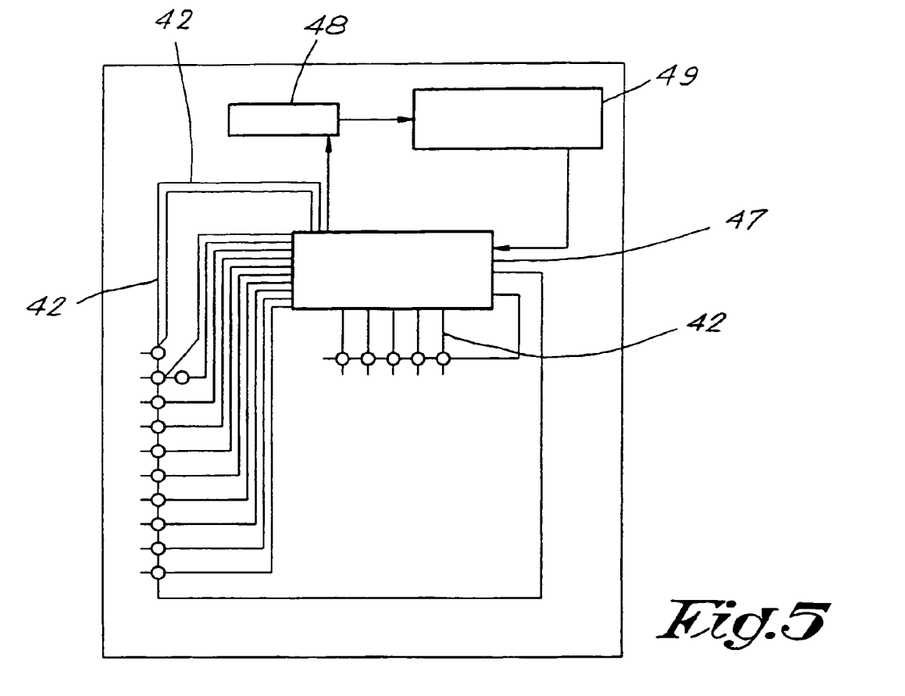
FIG. 5 schematically represents a base plate of the unit in the shape of a printed circuit.

The processing unit 43, as is represented in FIG. 5, consists of a microprocessor 47 whose entries are connected to the pressure contacts 4, 5 and 6 and whose port leads to the connection element 45 via a buffer 48 and an interface 49.

Figure 1:
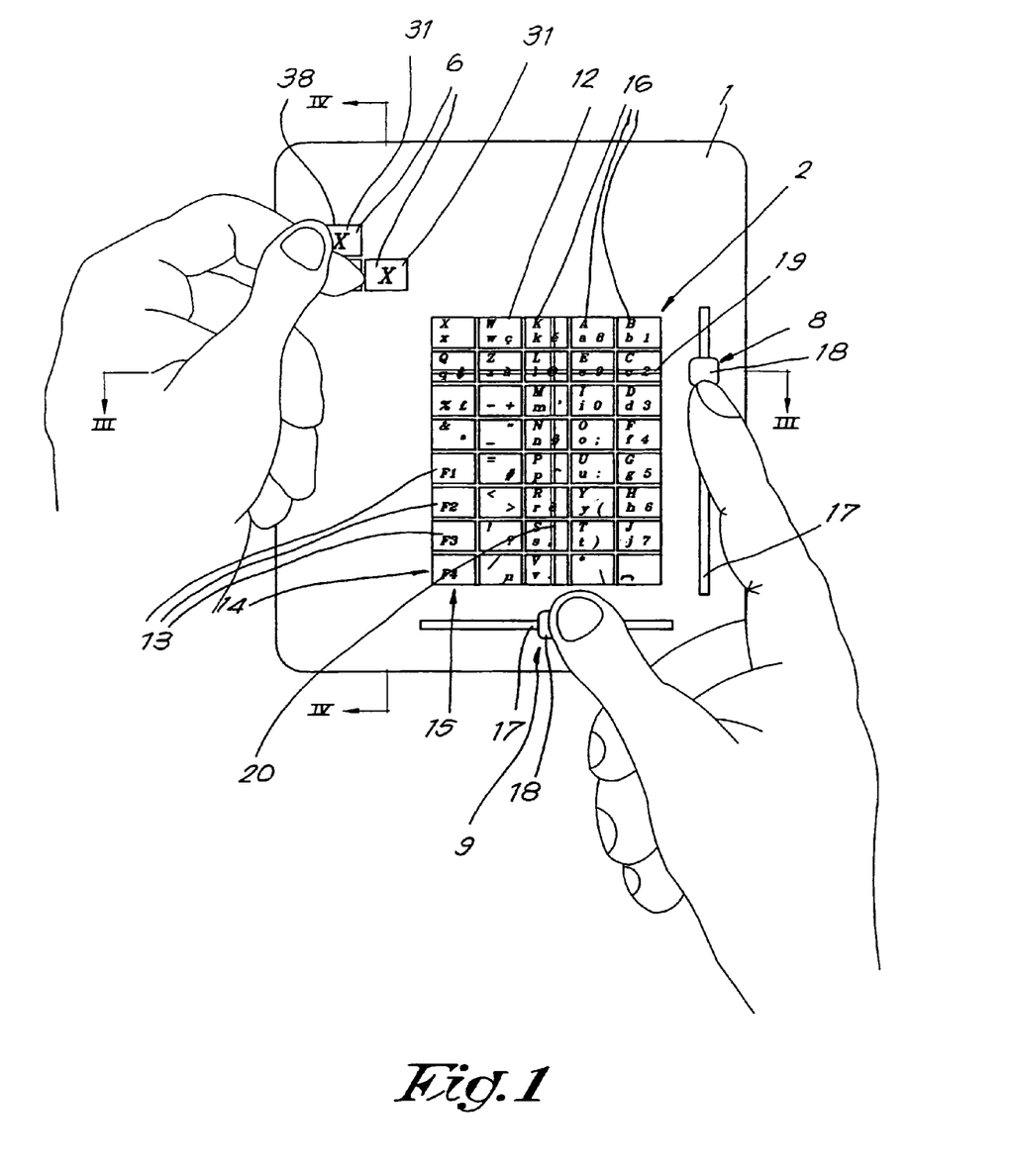
FIG. 1 represents a top view of a unit according to the invention.

The working of the above-described unit is quite simple and as follows:

The guide wires 19 and 20 are placed opposite to a row 14, column 15 respectively by means of the slide buttons 18 in order to select a field 13 situated above the crossing of both guide wires 19 and 20, as represented in FIG. 1.

The sliding eyes 28, 29 respectively, with he locking pins 30, 31 respectively attached to it, are in this manner placed above a corresponding row pressure contact 4, column pressure contact 5 respectively, situated In the extension of the selected row 14, column 15 respectively, by means of the guide wires 19, 20 respectively.

Thanks to the presence of the little wheels 32 and 33, this sliding movement does not experience much resistance, and the guide wires 19 and 20 always remain parallel to the rows 14 and the columns 15.

In a following step, one symbol 16 is selected from the selected field 13 by pressing the push button 37 of one corresponding pressure contact 6, for example but not necessarily so with the other hand than the one with which the slide buttons 18 have been moved, as represented in FIG. 1.

Thanks to this operation, the position of the switch mechanism 36 of the above-mentioned pressure contact 6 is altered by the far end 39.

Simultaneously, the linkage arrangement 21 is pushed by the button 37, against the resilience of spring 40, towards the base panel 3.

The bars 22 and 23 hereby pivot at their far ends 26 and 27, and these bars are pushed towards the base plate 3, against the action of the spring 25.

The bars 22 and 23 push the sliding eyes 28 and 29 towards the base panel 3, as a result of which the locking pins 30 and 31 change the position of the selected row or column pressure contact 4 or 5 situated underneath it.

By pressing a single push button 37, the positions of a single row pressure contact 4, a single column pressure contact 5 and a single pressure contact 6 are simultaneously changed in a combination which univocally characterizes a single selected symbol 16.

Figure 6:
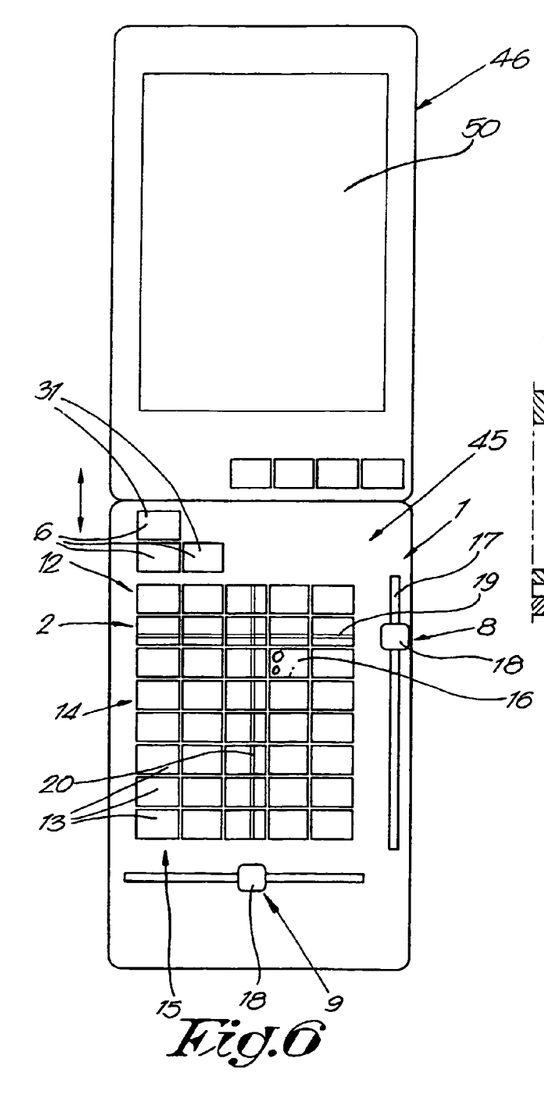
FIG. 6 represents a top view of the unit coupled to a PDA.
Figure 7:
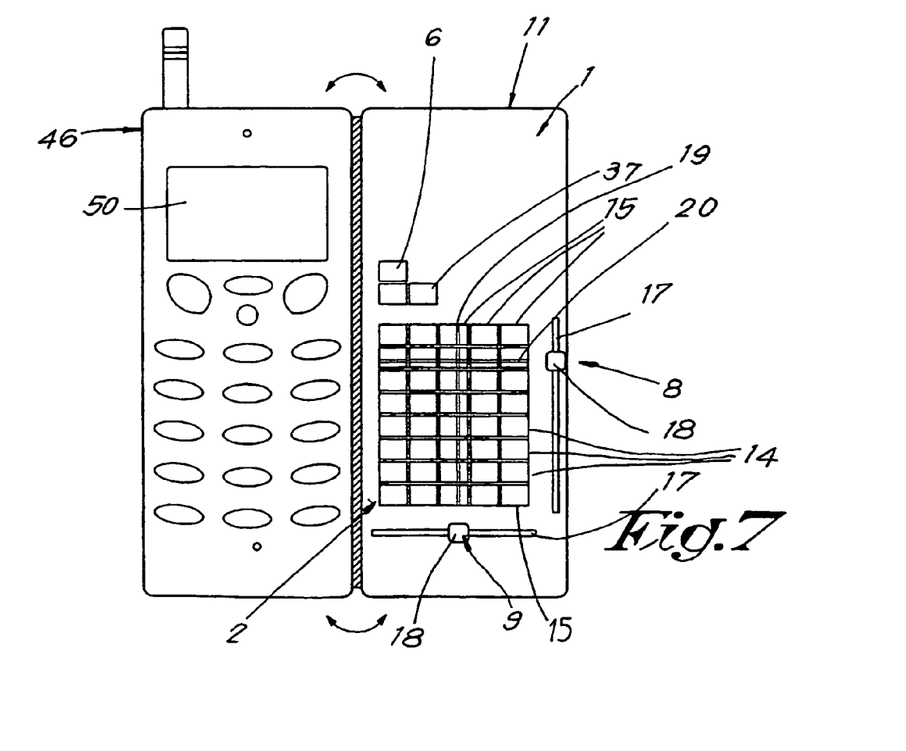
FIG. 7 represents a top view analogous to that in FIG. 6, but with the unit coupled to a mobile phone.

The ensuing electric signals are translated by the electronic processing unit 43 into a digital signal which is recognizable to the digital device 46 with which the unit is connected as represented in FIGS. 6 and 7.

The digital device 46 can be a PDA, as represented in FIG. 6. The unit is provided with one end in a groove in the PDA. In this groove are provided the necessary contacts for transmitting the signal of the unit to the device 46.

The alphanumerical data or function commands then become visible on the screen 50 of the PDA.

Naturally, the device itself may also be provided with a screen 50. This screen can be provided next to the window 12.

According to an embodiment which is not represented in the figures, it is also possible to replace the window 12 by an electronic screen upon which the fields 13 with the symbols 16 are represented and upon which are also represented a vertical and a horizontal line respectively, also in a sliding manner in relation to the selection elements 8–9.

FIG. 7 represents the unit coupled to a mobile phone.

In all cases, one particular symbol is selected and confirmed by means of a restricted number of manual operations, in particular by moving two selection elements 8 and 9 and by pressing one of the pressure contacts 6 to be manually operated, and a corresponding signal is sent to the device 46.

The pressure contacts 6 must not necessarily be part of the pressure mechanism 7.

The slide buttons 18 and the pressure contacts 6 must not necessarily be situated in the positions represented in the drawings. In a left-handed embodiment, they can be placed mirrorwise in relation to an axial line of the table 2 which is parallel to the columns 15.

Figure 8:
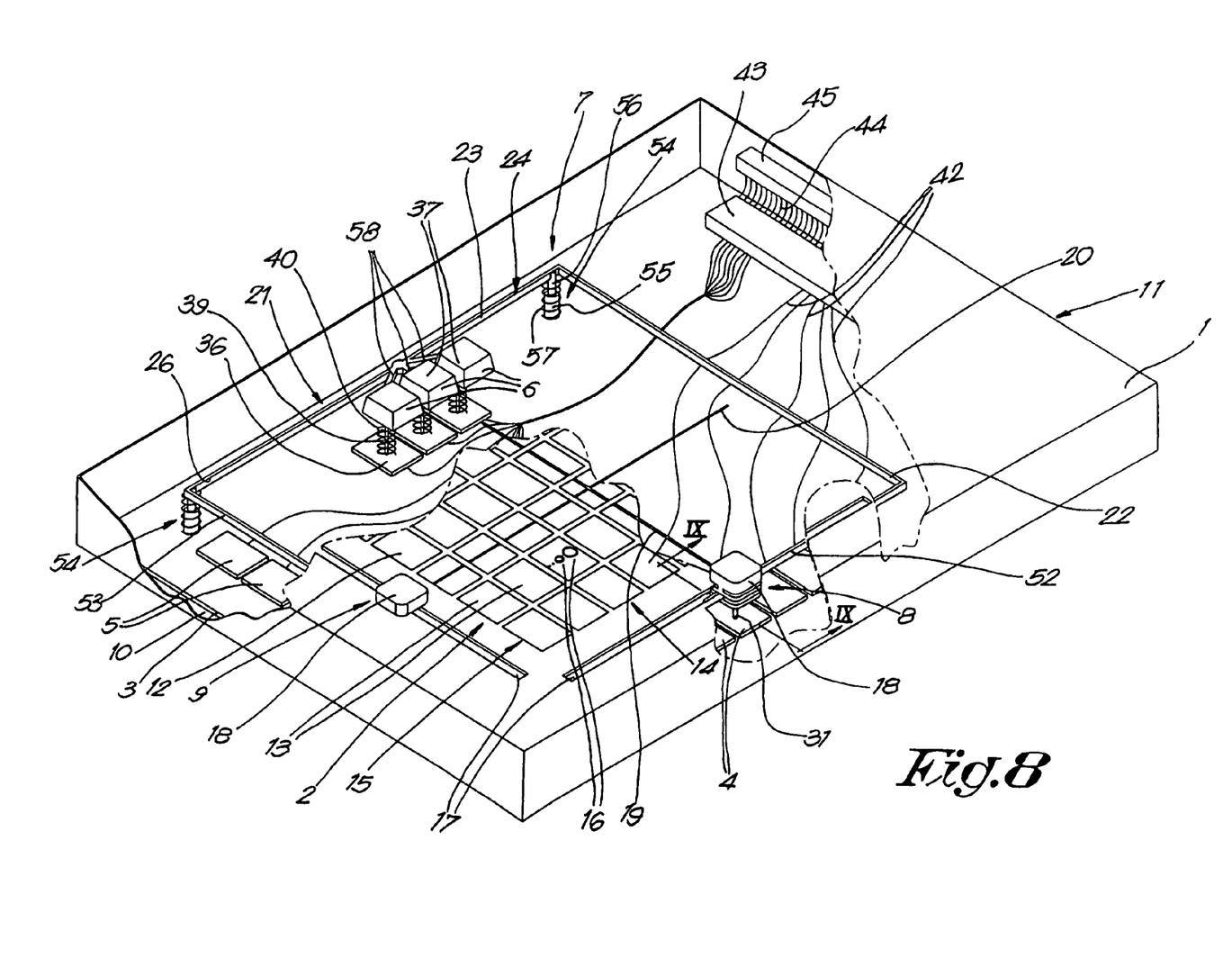
FIG. 8 represents a variant of the embodiment of the unit in FIG. 1.
Figure 9:
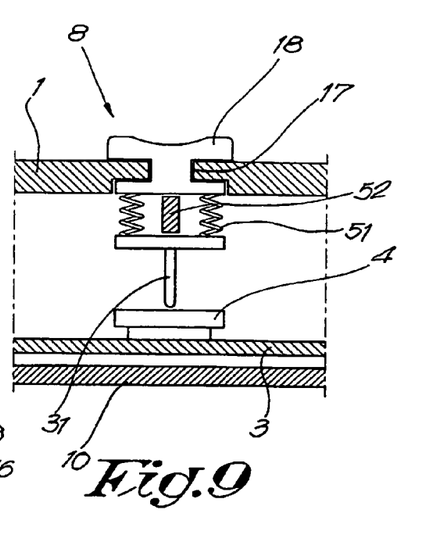
FIG. 9 represents a section according to line IX—IX in FIG. 8 to a larger scale.

FIGS. 8 and 9 represent a variant of an embodiment of the unit represented in FIG. 1, whereby this variant of an embodiment mainly differs from that in FIG. 1 in that:

- the pressure contacts 4–5 are in this case situated on the opposite side of the unit, whereby these pressure contacts 4–5 are situated more in particular under the slots 17 for the corresponding slide buttons 18 of the selection elements 8–9, and whereby the corresponding locking pins 30–31 of these selection elements 8–9 are in this case suspended to the lower side of the slide buttons 18 by means of little springs 51;
- the linkage arrangement 21 of the pressure mechanism 7 is in this case made in the shape of a rectangular frame which works in conjunction with the above-mentioned locking pins 30–31, whereby this linkage construction 21 extends parallel to the base 3 and is formed of bars which are mutually fixed to one another, namely the above-mentioned bars 22 and 23 and two extra bars, 52 and 53 respectively, which extend under the slots 17 between the slide buttons 18 and the corresponding locking pins 30–31;
- the linkage arrangement 21 is in this case fixed in a sliding manner on the base 3 by means of two guides 54 which are provided at right angles on the base 3 for example on the far ends 24 and 26 of the bar 23, whereby each of these guides 54 consists for example of a small case 55 which is attached on the base and in which a pin 56 connected to the bar 23 is provided in a sliding manner;
- the linkage arrangement 21 is spring-mounted on the base 3 by means of little springs 57 which are provided between said linkage arrangement 21 and the base 3, for example each around one of the aforesaid guides 54;
- The three additional pressure contacts 6 are in this case situated at equal distances next to the rod 23, whereby the corresponding push buttons 37 of these pressure contacts 6 are part of the pressure mechanism 7, as, when they are pushed in, they press onto part 58 which radially protrudes from the middle of the bar 23, as a result of which the linkage arrangement 21 is pushed towards the base 3.

The use and operation of the unit from FIGS. 8 and 9 is as follows.

By means of the slide buttons 18 and the guide wires 19 and 20 respectively attached thereto, a field of symbols 13 is first of all selected above the crossing of the guide wires 19–20.

By shifting the slide buttons 18, the locking pins 30 and 31 suspended onto them are also provided above the pressure contacts 4 and 5 respectively which are situated in the extension of the row 14 and the column 15 respectively, corresponding to the selected field of symbols 13.

Next, one of the three push buttons 37 of the pressure contacts 6 is pressed so as to select one of the three symbols 16 in the selected field of symbols 13.

By pressing the push button 37, the switch mechanism 36 of the pressure contact 6 situated underneath it is switched, and the linkage arrangement 21 is simultaneously moved parallel to itself towards the base plate 3, so that the respective bars 52 and 53 of the linkage arrangement 21 push the corresponding locking pins 30 and 31 down, against the action of the springs 51, so that the pressure contacts 4 and 5 situated underneath it are also switched.

By pressing a single push button 37, the positions of a single row pressure contact 4, a single column pressure contact 5 and a single pressure contact 6 are simultaneously changed in a combination which univocally characterizes a single selected symbol 16.

Further, the working of this unit is entirely analogous to that of the unit from FIG. 1.

The invention is by no means limited to the above-described embodiments represented in the accompanying drawings; on the contrary, such a unit for the input of data can be made in all sorts of variants while still remaining within the scope of the invention.

The invention claimed is:

1. Portable unit for the input of either or both alphanumerical data and function commands in a digital device (46), comprising a control panel (1); a base plate (3) connected to the control panel; said control panel including pressure contacts (4,5) carried by the base plate and which are connected to an electronic processing unit (43);
   - a table (2) provided on the control panel (1) with a number of rows (14) and columns (15) comprising fields (13) and a group of symbols (16) in a number of said fields (13) symbolizing either or both the alphanumerical data and or the function commands,
   - a first group of pressure contacts (4, 5) on the base plate (3) positioned in two rows extending parallel to the rows (14) and columns (15) of the table (2), each of the pressure contacts (4, 5) of said first group situated along an extension of a row (14) or of a column (15),
   - two selection elements (8, 9) moveable in relation to the pressure contacts (4, 5) of the first group and the table (2), and parallel to the rows (14) and the columns (15) respectively, into positions at which they are located opposite a respective pressure contact (4, 5) of the first group, pressure contact (4, 5), in an extension of a selected row (14), and a selected column (15);
   - a pressure mechanism (7) arranged to enable manual changing of the position of the pressure contacts (4, 5) of the first group of pressure contacts located opposite the selection elements (8, 9) by means of the latter; and
   - a second group of pressure contacts (6) which are arranged to be manually operated, the number of pressure contacts (6) in said second group being equal to the maximum number of symbols (16) of a field (13), and wherein each contact of the second group corresponds to a single symbol (16) of a selected field (13).

2. Portable unit according to claim 1, wherein the second group of pressure contacts (6) is provided on the base plate (3).

3. Portable unit according to claim 1, wherein each of said pressure contacts of said second group (6), apart from a switch mechanism (36), also comprises a push button (37), and each push button (37) is a part of the pressure mechanism (7).

4. Portable unit according to claim 1, wherein the pressure mechanism (7) comprises a linkage arrangement (21) which, when pressed upon, presses selection elements (8, 9) to alter the position of the selected pressure contacts (4, 5) of said first group.

5. Portable unit according to claim 4, wherein for each of the pressure contacts (6) of the second group, a switch mechanism (36) is provided on the base plate (3), and each push button (37) has a far end (39) working in conjunction with each switch mechanism, and also has a part which works in conjunction with the linkage arrangement (21), such that when a push button (37) is pressed, not only said linkage arrangement (21) is pressed, but also the position of the above-mentioned switch mechanism (36) is altered.

6. Portable unit according to claim 5, wherein the linkage arrangement (21) comprises two bars (22, 23) which are perpendicular to one another and extend opposite the rows of pressure contacts (4, 5) of said first group and which can be moved together towards the base plate (3) by one of the push buttons (37) in a resilient manner.

7. Portable unit according to claim 1, wherein the selection elements (8, 9) each comprise a rigid guide wire (19, 20) which is fixed to a slide button (18), and which extends parallel to the rows of the first group of pressure contacts (14) and the columns (15) of the table (2) respectively, under the control panel (1), and which wires are guided via slots (17) in the control panel (1).

8. Portable unit according to claim 7, wherein the guide wires (19, 20) are fixed at one far end to a sliding eye (28, 29) surrounding a bar (23, 22) of the linkage arrangement (21) and carry a locking pin (30, 31) for pressing a pressure contact (4 or 5).

9. Portable unit according to claim 8, wherein the sliding eye (28, 29) can be rolled over the bar (23, 22) around which said sliding eye (28, 29) is located.

10. Portable unit according to claim 7, wherein the linkage arrangement (21) comprises resilient frame comprising the two aforesaid bars (22, 23) and two additional bars (52, 53) connected onto the latter which extend mainly parallel to and under a respective slot (17).

11. Portable unit according to claim 10, wherein the pressure contacts (4, 5) of the first group are located under the above-mentioned bars (52, 53) and in that each slide button (18) carries a locking pin (30, 31) for pressing a pressure contact (4 or 5), and wherein each of the locking pins (30, 31) is operable in conjunction with the linkage arrangement (21) of the pressure mechanism (7).

12. Portable unit according to claim 1, wherein the electronic processing unit (43) comprises a buffer (48), an interface (49) and a microprocessor (47) with which all the pressure contacts (4, 5) and the additional pressure contacts (6) are connected.

* * * * *